(No Model.)     2 Sheets—Sheet 1.

N. H. GROSSELIN.
CLOTH NAPPING MACHINE.

No. 535,581.     Patented Mar. 12, 1895.

Witnesses
Jno. G. Hinkel
G. O. Kramer.

Inventor
N. H. Grosselin
By
Foster Freeman
Attorneys (No Model.) 2 Sheets—Sheet 2.

N. H. GROSSELIN.
CLOTH NAPPING MACHINE.

No. 535,581. Patented Mar. 12, 1895.

Witnesses
J. G. Hinkel
Alex N. Dobson

Inventor
Nicolas H. Grosselin
By Foster Freeman
Attorneys

UNITED STATES PATENT OFFICE.

NICOLAS HENRY GROSSELIN, OF SEDAN, FRANCE, ASSIGNOR TO CHARLES HEAP, OF ROCHDALE, ENGLAND.

CLOTH-NAPPING MACHINE.

SPECIFICATION forming part of Letters Patent No. 535,581, dated March 12, 1895.

Application filed May 1, 1894. Serial No. 509,696. (No model.) Patented in France May 27, 1884, No. 162,320.

*To all whom it may concern:*

Be it known that I, NICOLAS HENRY GROSSELIN, a citizen of the French Republic, residing at Sedan, France, have invented a certain new and useful Improvement in Cloth-Napping Machines, of which the following is a specification.

My invention for which Letters Patent of the Republic of France were issued May 27, 1884, No. 162,320, relates to that class of napping machines in which a series of napping rolls is carried by a revolving drum or head; and my invention consists of means for operating the napping rollers, as fully set forth hereinafter and as illustrated in the accompanying drawings, in which—

Figure 1:
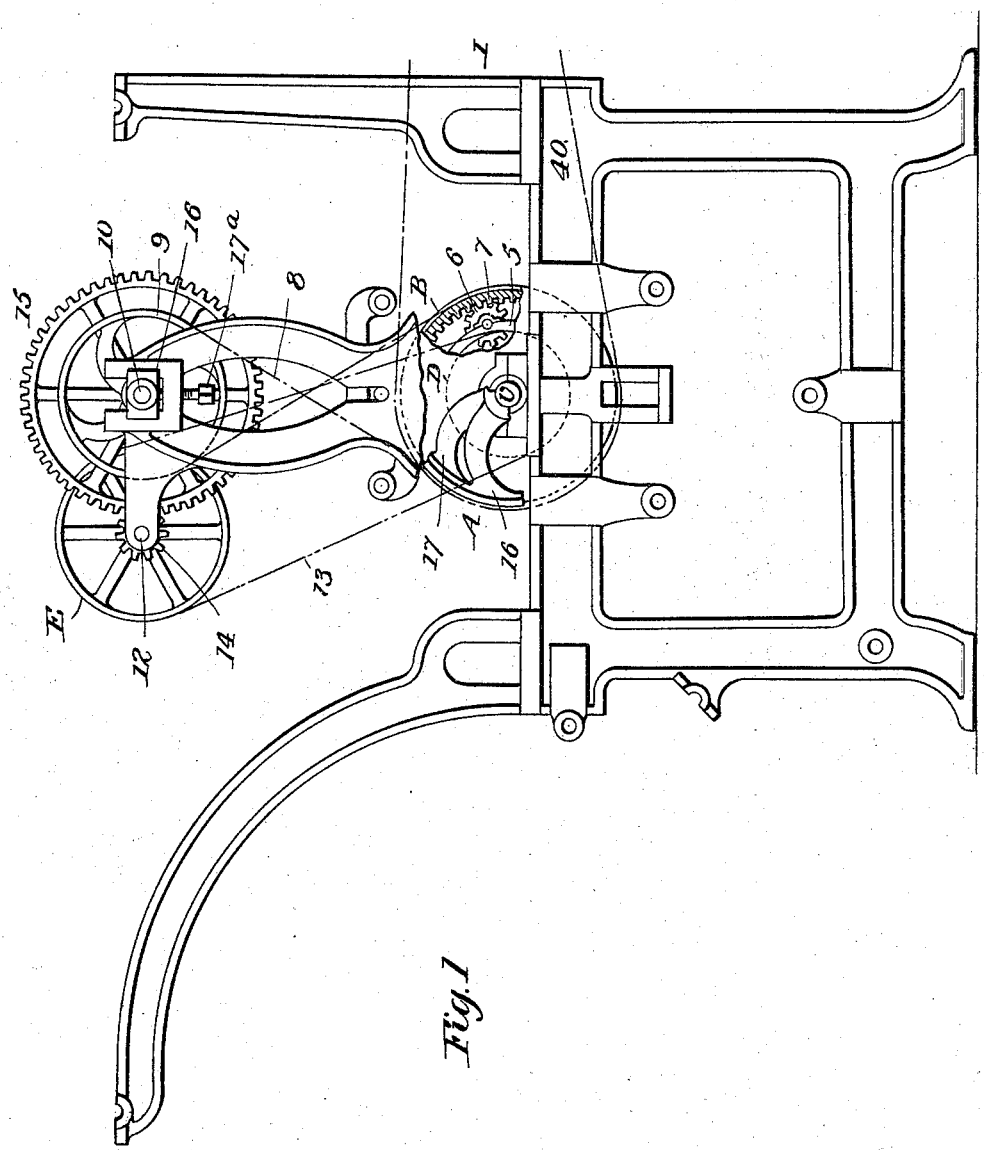
Figure 2:
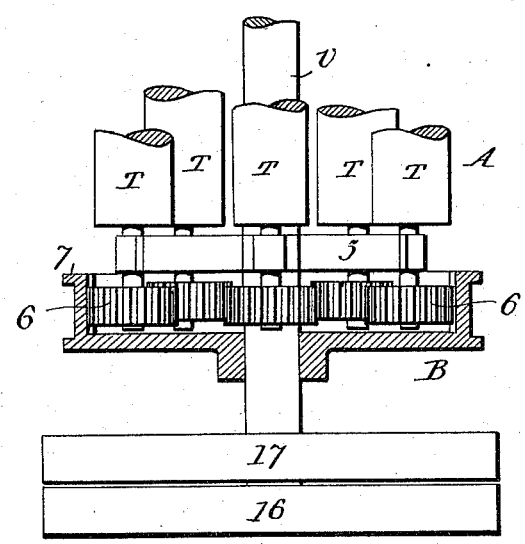

Figure 1 is an elevation of sufficient of a napping machine to illustrate my improvement. Fig. 2 is a plan in part section of part of the drum.

The frame I of the machine is suitably constructed to support the parts hereinafter described and in bearings on said frame turns the shaft $v$, of a drum A which consists of the said shaft, two heads 5, and a series of napping rollers T, the axles of which have their bearings in the heads 5, and carry (at one or both ends of the drum) wheels 6 which may be toothed pinions as shown or they may be friction wheels or pulleys. With each series of wheels 6, which I will hereinafter term the pinions, engages a loose gear B, in the form of a wheel turning about an axis which may be that of the drum shaft. The said gear is a toothed gear, if the pinions are toothed pinions, or is a friction gear if the pinions are friction pinions, and it consists of a disk which, as shown, may be a flanged disk with an internally toothed flange 7, engaging the teeth of the pinions at any suitable point, as external to the latter; and constitutes a gear which drives the pinions and which may be supported in any suitable manner, but preferably turns loosely upon the shaft $v$, as the support.

There will be gears at one or both ends of the drum accordingly as the shafts of the napping rolls have pinions at one or both ends.

The gear or gears B, and the drum may be driven in any suitable manner. As shown the drum is driven from a driving belt 40, passing to a pulley on the shaft $v$, and there is a single gear B, at one end of the drum and the flange 7, thereof is formed on the periphery to receive a driving belt 8, that passes to a pulley 9, upon a counter-shaft 10, which is driven by intermediate gearing or mechanism from the shaft $v$, of the drum.

The intermediate gearing or mechanism shown, Fig. 1, consists of a pulley D, on the shaft $v$, and a corresponding pulley E turning upon a stud 12, said pulley E receiving a belt 13, passing to the other pulley; and a pinion 14 connected with the pulley E, gears with a toothed wheel 15 upon the shaft 10. The bearings 16, of the shaft 10 are adjustable by means of screws $17^a$, to tighten the belt 8.

Upon one end of the shaft $v$, is a pulley 16, receiving the driving belt 40 by means of which the shaft is turned, together with its drum, an idler pulley 17, turning alongside the driving pulley 16.

The main feature of my invention consists in driving the pinions by means of the loose gear having its axis concentric with that around which the drum turns, whereby I am enabled to operate the said pinions with great certainty and precision.

The precision of movement is effected in part by securing a circular bearing for the belt 8, that drives the napping rolls upon the gear B, instead of upon the pinions at the ends of the napping rolls as is sometimes done, and in part by use of the rigid gear having teeth engaging toothed pinions which prevents any slip, all of the napping rolls being thereby compelled to turn at the same rate of speed securing a very regular and uniform action upon the fabric.

I do not here claim the means for securing varying action of the loose gear.

Without limiting myself to the precise construction and arrangement of parts shown, I claim as my invention—

In a napping machine the combination of a drum, napping rolls carried thereby and provided with pinions, a loose gear turning on an axis concentric with that of the drum shaft, and engaging and driving the said pinions, and devices for driving said gear to actuate the napping rolls in operating upon the cloth, substantially as set forth.

In testimony whereof I have signed my name to this specification in the presence of two subscribing witnesses.

NICOLAS HENRY GROSSELIN.

Witnesses:
A. HUGUEND,
R. DE LEINE.